(12) United States Patent
Zhao et al.

(10) Patent No.: US 11,285,513 B2
(45) Date of Patent: Mar. 29, 2022

(54) THREE-DEGREE-OF-FREEDOM HYBRID VIBRATORY SCREENING MECHANISM, CONTROL METHOD THEREOF, AND HARVESTER

(71) Applicant: JIANGSU UNIVERSITY, Jiangsu (CN)

(72) Inventors: Zhan Zhao, Jiangsu (CN); Fang Qin, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 117 days.

(21) Appl. No.: 16/772,368

(22) PCT Filed: Mar. 29, 2019

(86) PCT No.: PCT/CN2019/080283
§ 371 (c)(1),
(2) Date: Jun. 12, 2020

(87) PCT Pub. No.: WO2020/191786
PCT Pub. Date: Oct. 1, 2020

(65) Prior Publication Data
US 2021/0402437 A1    Dec. 30, 2021

(30) Foreign Application Priority Data

Mar. 22, 2019   (CN) .......................... 201910222481.3

(51) Int. Cl.
*B07B 1/28*      (2006.01)
*A01D 41/12*   (2006.01)
(Continued)

(52) U.S. Cl.
CPC .............. *B07B 1/286* (2013.01); *A01D 41/12* (2013.01); *A01F 12/448* (2013.01); *B07B 1/42* (2013.01); *B07B 1/46* (2013.01)

(58) Field of Classification Search
CPC .. B07B 1/286; B07B 1/42; B07B 1/46; A01D 41/12
(Continued)

(56) References Cited

U.S. PATENT DOCUMENTS 7,673,755 B2 *   3/2010   Gemmill .................. B07B 1/42
                                                              209/405
2011/0036759 A1   2/2011   Ballman

FOREIGN PATENT DOCUMENTS

CN   102120214 A    7/2011
CN   202045073 U   11/2011
(Continued)

*Primary Examiner* — Terrell H Matthews
(74) *Attorney, Agent, or Firm* — Saliwanchik, Lloyd & Eisenschenk

(57) ABSTRACT

The present invention provides a three-degree-of-freedom hybrid vibratory screening mechanism, a control method thereof, and a harvester. The three-degree-of-freedom hybrid vibratory screening mechanism comprises a frame, a vibrating screen, a first driving mechanism, a second driving mechanism, sensors and a controller; parallel drive of hydraulic motors are used for achieving two-degree-of-freedom rotational adjustment of the horizontal attitude angle and inclination angle of the screen surface of the vibrating screen, and the first driving mechanism drives the vibrating screen to reciprocate in one degree of freedom, so as to realize three-degree-of-freedom vibration adjustment of the screen surface; a vibration parameter control model is established by means of theoretical analysis in combination with experiment. In the operating process, the sensors installed at the tail part of the vibrating screen monitor the loss rate and distribution of the grains in real time, and the horizontal attitude angle of the screen surface, inclination angle of the screen surface and vibration frequency are self-adaptively optimized and adjusted to promote uniform and discrete distribution of the material on the screen (Continued)

surface, so that the screening efficiency of the material under a condition of non-uniform material feeding is effectively improved and the loss rate of the grains is decreased.

10 Claims, 3 Drawing Sheets

(51) Int. Cl.
  *B07B 1/46* (2006.01)
  *B07B 1/42* (2006.01)
  *A01F 12/44* (2006.01)
(58) Field of Classification Search
  USPC .......................................................... 209/341
  See application file for complete search history.

(56) References Cited

FOREIGN PATENT DOCUMENTS

| CN | 204503562 U | | 7/2015 |
|---|---|---|---|
| CN | 205599478 U | | 9/2016 |
| CN | 106077673 A | | 11/2016 |
| CN | 106612996 A | * | 5/2017 |
| CN | 110000084 A | * | 7/2019 |
| CN | 111822079 A | * | 10/2020 |

* cited by examiner

THREE-DEGREE-OF-FREEDOM HYBRID VIBRATORY SCREENING MECHANISM, CONTROL METHOD THEREOF, AND HARVESTER

CROSS REFERENCE TO RELATED APPLICATIONS

This application is a National Stage Application of International Application Number PCT/CN2019/080283, filed Mar. 29, 2019; which claims priority to Chinese Application No. 201910222481.3, filed Mar. 22, 2019.

TECHNICAL FIELD

The present invention belongs to the research field of screening mechanisms, and particularly relates to a three-degree-of-freedom hybrid vibratory screening mechanism, a control method thereof, and a harvester.

BACKGROUND ART

Cleaning is an important technical link in the combined grain harvesting operation, and the cleaning performance has direct influence on the loss rate and cleaning rate of the grains and the operating efficiency of the entire machine. At present, a combined grain harvester mainly employs a combined cleaning device consisting of a blower fan and a vibrating screen, and the threshed mixed material falls onto the screen surface of the vibrating screen. Under the combined action of the blower fan and the vibrating screen, the grains pass through the screen and enter a barn, while the impurities are discharged out of the harvester, and some grains which fail to pass through the screen are also discharged from the tail of the vibrating screen, thus forming cleaning loss. The distribution of the material on the screen surface is an important factor that determines the screening performance, and it is mainly affected by the structural parameters such as the structure of the screen meshes, the horizontal attitude angle and inclination angle of the screen surface, and the movement parameters such as the vibration mode, vibration frequency and vibration amplitude, etc. Existing single-degree-of-freedom reciprocating vibratory screening mechanisms are fixed, have a single motion track, can't change the attitude of the screen surface, easily cause uneven distribution of the material on the screen surface during the cleaning operation; in some areas, the material layer is relatively thick and can't achieve effective screen penetration, thus causing increased cleaning loss, which is particularly prominent during harvesting of high-yield rice with high water content and sloping operation.

CONTENTS OF THE INVENTION

In view of the above problems, the present invention provides a three-degree-of-freedom hybrid vibratory screening mechanism, a control method thereof, and a harvester. The mechanism is an RRT three-degree-of-freedom series-parallel vibratory screening mechanism (i.e., two rotational degrees of freedom and one translational degree of freedom), in which two-degree-of-freedom rotation of the screen surface is realized with a parallel mechanism to adjust the inclination angle and horizontal attitude angle of the screen surface, and the screen surface is driven to reciprocate by a serially connected eccentric crank-link mechanism. The present invention proposes an adjustment scheme of monitoring the grain loss at the tail part of the vibrating screen via sensors, and optimizing and determining the movement parameters of the screen surface according to the established mathematical models for grain loss, inclination angle and horizontal attitude angle of the screen surface, so as to realize self-adaptive control of the inclination angle and horizontal attitude angle of the screen surface during combined grain harvesting operation, and thereby promote uniform distribution and penetration of the material on the screen surface of the vibrating screen, improve screening efficiency and adaptability to different operation environments.

The present invention further provides a harvester containing said three-degree-of-freedom hybrid vibratory screening mechanism.

The technical scheme employed to solve the technical problem in the present invention is as follows:

A three-degree-of-freedom hybrid vibratory screening mechanism, comprising:

A vibrating screen;

A first driving mechanism, which is connected to the vibrating screen and drives the vibrating screen to reciprocate;

A second driving mechanism, which is connected to the vibrating screen and configured to adjust the inclination angle $\alpha$ and horizontal attitude angle $\beta$ of the screen surface of the vibrating screen;

Sliding table bases, lead screws and slide blocks, wherein each lead screw is installed on the corresponding sliding table base, each slide block is installed on the corresponding lead screw, and an output shaft of the second driving mechanism is connected to the lead screws; each slide block is rotationally connected to one end of a hanger rod, and the other end of the hanger rod is rotationally connected to the vibrating screen;

Sensors configured to monitor the grain loss rate and distribution at the tail part of the vibrating screen; and A controller connected to the first driving mechanism, the second driving mechanism and the sensors respectively.

In the above scheme, the second driving mechanism comprises a plurality of second hydraulic motors connected in parallel;

A first solenoid directional valve and a second proportional flow valve are arranged between the second hydraulic motors and the oil tank.

In the above scheme, the first driving mechanism is the first hydraulic motor;

A connecting pipeline between the first hydraulic motor and the oil tank is provided with the first proportional flow valve and the first solenoid directional valve.

In the above scheme, the first driving mechanism is connected to the vibrating screen via an eccentric crank-link mechanism;

The eccentric crank-link mechanism comprises an eccentric rotating disk and a driving link;

The eccentric rotating disk is installed on an output shaft of the first driving mechanism, and rotationally connected to one end of the driving link, and the other end of the driving link is rotationally connected to the vibrating screen.

In the above scheme, the three-degree-of-freedom hybrid vibratory screening mechanism further comprises a constraining link, wherein one end of the constraining link is connected to a frame, and the other end of the constraining link is connected to the vibrating screen.

A harvester, comprising the three-degree-of-freedom hybrid vibratory screening mechanism.

A control method of the three-degree-of-freedom hybrid vibratory screening mechanism, comprising the following steps:

Monitoring, by the sensors, the grain loss rates $x_1$, $x_2$, $x_3$ ... $x_n$ in n areas at the tail part of the vibrating screen, wherein the total loss rate $x=x_1+x_2+x_3+ \ldots +x_n$;

Transmitting the vibration frequency f, inclination angle α of the screen surface, and horizontal attitude angle β of the screen surface of the vibrating screen and the grain loss rate to the controller;

Obtaining an ideal horizontal attitude angle $\beta_0$ of the screen surface according to a control model for the horizontal attitude angle β of the screen surface, and controlling the second driving mechanism to adjust the horizontal attitude angle of the screen surface of the vibrating screen to $\beta_0$, by the controller;

Obtaining an ideal vibration frequency $f_0$ and an ideal inclination angle $\alpha_0$ of the screen surface according to a control model for the vibration frequency f and inclination angle α of the screen surface, controlling the second driving mechanism to adjust the inclination angle of the screen surface of the vibrating screen to $\alpha_0$, and controlling the first driving mechanism to adjust the vibration frequency of the vibrating screen to $f_0$, by the controller.

In the above scheme, the control model for the horizontal attitude angle β of the screen surface is as follows:

$$\begin{cases} V_x = F_3(f, \beta, \chi_1, \chi_2, \chi_3 \cdots \chi_n) \\ \min\{V_x\} \end{cases}$$

Where, $V_x$ is a coefficient of variation of material feeding distribution difference for $x_1$, $x_2$, $x_3$ ... $x_n$, respectively.

In the above scheme, the control model for the vibration frequency f and the inclination angle α of the screen surface is:

$$\begin{cases} x = F_1(f, \alpha) \\ \gamma = F_2(f, \alpha) \\ \max\{M(x, \gamma) = a_1\gamma - a_2 \times | a_1, a_2 = \text{constant}\} \end{cases}$$

Where, γ is the cleaning rate and $a_1$ and $a_2$ are the weight coefficients respectively.

In the above scheme, the steps of controlling the horizontal attitude angle of the screen surface, the inclination angle of the screen surface and the vibration frequency of the vibrating screen by the controller are specifically as follows:

Controlling the operating mode of the second solenoid directional valve and the opening degree of the second proportional flow valve arranged between the second driving mechanism and the oil tank respectively to drive the operation of the second driving mechanism and adjust the horizontal attitude angle and inclination angle of the screen surface of the vibrating screen, by the controller; and Controlling the opening degree of the first proportional flow valve arranged between the first driving mechanism and the oil tank to drive the operation of the first driving mechanism and adjust the vibration frequency of the vibrating screen, by the controller.

Compared with the prior art, the present invention attains the following beneficial effects: in the present invention, the inclination angle α and horizontal attitude angle β of the screen surface of the vibrating screen are adjusted by parallel hydraulic motors, and the vibrating screen is driven to reciprocate by a serially connected eccentric crank-link mechanism, so that a combination of three-degree-of-freedom movement forms of the screen surface is realized; the sensors monitor the loss rate and distribution of the grains at the tail part of the vibrating screen in real time, and the vibration parameters of the screen surface are self-adaptively optimized and adjusted according to the established control models for the horizontal attitude angle of the screen surface, inclination angle of the screen surface and vibration frequency, in order to promote uniform and discrete distribution of the material on the screen surface, so that the screening efficiency of the material can be effectively improved under a condition of non-uniform feeding and the loss rate of the grains can be decreased.

DESCRIPTION OF DRAWINGS

The above-mentioned and/or additional aspects and advantages of the present invention will become more apparent and can be understood more easily through description of embodiments with reference to the accompanying drawings. Among the drawings.

In the figures: 1—frame; 2—first hydraulic motor; 3—eccentric rotating disk; 4—first fisheye bearing; 5—driving link; 6—second fisheye bearing; 7—vibrating screen; 8—monitoring sensor; 9—constraining link; 10—third fisheye bearing; 11—fourth fisheye bearing, 12—sliding table base; 13—lead screw; 14—slide block; 15—second hydraulic motor; 16—fifth fisheye bearing; 17—hanger rod; 18—sixth fisheye bearing; 19—first proportional flow valve; 20—first solenoid directional valve; 21—second solenoid directional valve; 22—second proportional flow valve; 23—oil tank; 24—controller; 25—display device.

EMBODIMENTS

Hereunder examples of the present invention will be described in details. The examples are illustrated in the accompanying drawings, wherein, identical or similar reference numbers are used to indicate identical or similar elements or elements with identical or similar functions. It should be noted that the examples described with reference to the accompanying drawings are only exemplary and are provided only to explain the present invention rather than constitute any limitation to the present invention.

In the description of the present invention, it should be understood that the orientation or position relations indicated by terms "center", "longitudinal", "transverse", "length", "width", "thickness", "above", "under", "axial", "radial", "vertical", "horizontal", "inside", and "outside", etc., are based on the orientation or position relations indicated in the accompanying drawings. They are used only to ease and simplify the description of the present invention, rather than indicate or imply that the involved devices or components must have specific orientation or must be constructed and operated in specific orientation. Therefore, the use of these terms shall not be deemed as constituting any limitation to the present invention. In addition, the terms "first" and "second" are used only for illustrative purpose, and shall not be interpreted as indicating or implying relative importance or implicitly indicating the quantity of the indicated technical feature. Hence, a feature defined by "first" or "second" may explicitly or implicitly comprises one or more such features. In the description of the present invention, "a plurality of" or "multiple" indicates two or more, unless otherwise specified explicitly.

In the present invention, unless otherwise specified and defined explicitly, the terms "install", "connect", "fix", etc. shall be interpreted in their general meaning, for example, the connection can be fixed connection, detachable connection, or integral connection; can be mechanical connection or electrical connection; can be direct connection or indirect connection via a medium, or internal communication between two elements. The person skilled in the art may interpret the specific meanings of the terms in the present invention according to specific situation.

Example 1

Figure 1:
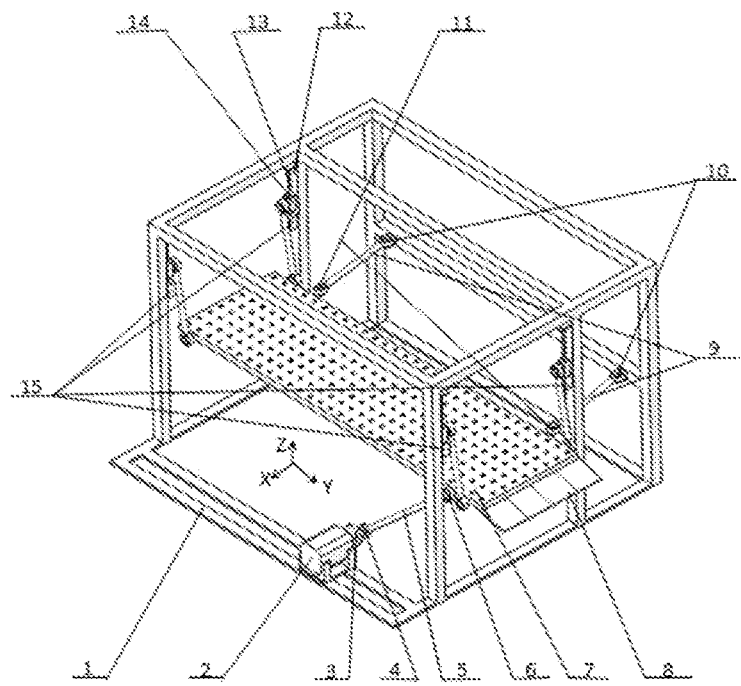
FIG. 1 is a schematic structural diagram of a three-degree-of-freedom hybrid vibratory screening mechanism.
Figure 2:
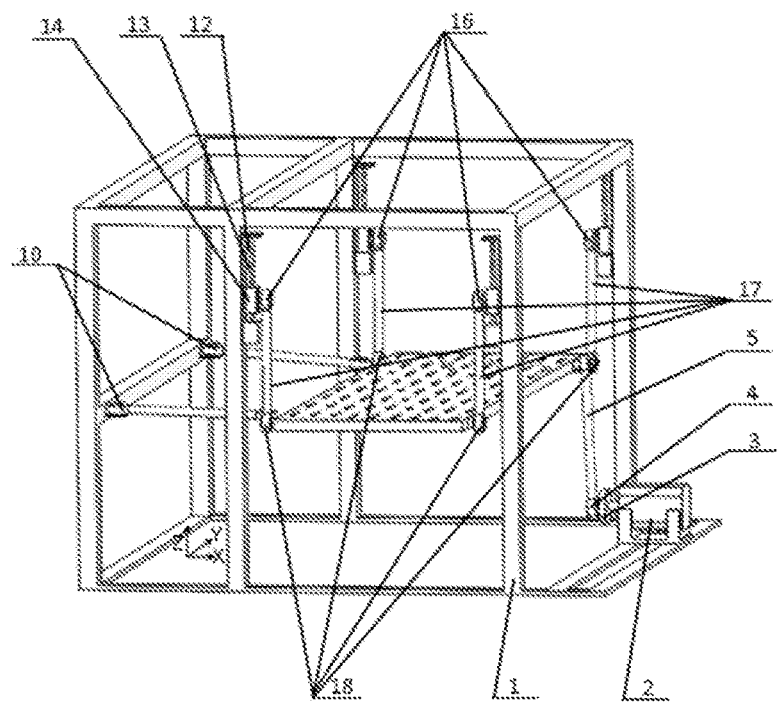
FIG. 2 is a schematic diagram of the hoisting structure of a three-degree-of-freedom hybrid vibrating screen.

FIGS. 1 and 2 show an embodiment of the three-degree-of-freedom hybrid vibratory screening mechanism according to the present invention. The three-degree-of-freedom hybrid vibratory screening mechanism comprises a frame 1, a vibrating screen 7, a first driving mechanism, a second driving mechanism, a plurality of sensors 8, and a controller 24.

The vibrating screen 7 is installed on the frame 1; the first driving mechanism is connected to the vibrating screen 7, and the first driving mechanism drives the vibrating screen 7 to reciprocate; the second driving mechanism is connected to the vibrating screen 7; the second driving mechanism is configured to adjust the inclination angle α and horizontal attitude angle β of the screen surface of the vibrating screen 7; the sensors 8 are configured to detect the grain loss rate and distribution at the tail part of the vibrating screen 7; the controller 24 is connected to the first driving mechanism, the second driving mechanism and the sensors 8 respectively.

Preferably, the first driving mechanism is a first hydraulic motor 2; the first hydraulic motor 2 is connected to an oil tank 23 through a pipeline; the connecting pipeline between the first hydraulic motor 2 and the oil tank 23 is provided with a first proportional flow valve 19 and a first solenoid directional valve 20.

Preferably, the three-degree-of-freedom hybrid vibratory screening mechanism further comprises sliding table bases 12, lead screws 13 and slide blocks 14;

The sliding table bases 12 are installed on the frame 1 respectively, each lead screw 13 is installed on the corresponding sliding table base 12, each slide block 14 is installed on the corresponding lead screw 13, and an output shaft of the second driving mechanism is connected to the lead screws 13; each slide block 14 is rotationally connected to one end of a hanger rod 17, and the other end of the hanger rod 17 is rotationally connected to the vibrating screen 7.

The first driving mechanism is connected to one side of the vibrating screen 7 via an eccentric crank-link mechanism, and the other side of the vibrating screen 7 is connected to the frame 1 via a constraining link 9; the eccentric crank-link mechanism comprises an eccentric rotating disk 3 and a driving link 5; the eccentric rotating disk 3 is installed on an output shaft of the first driving mechanism, and rotationally connected to one end of the driving link 5, and the other end of the driving link 5 is rotationally connected to the vibrating screen 7.

Figure 3:
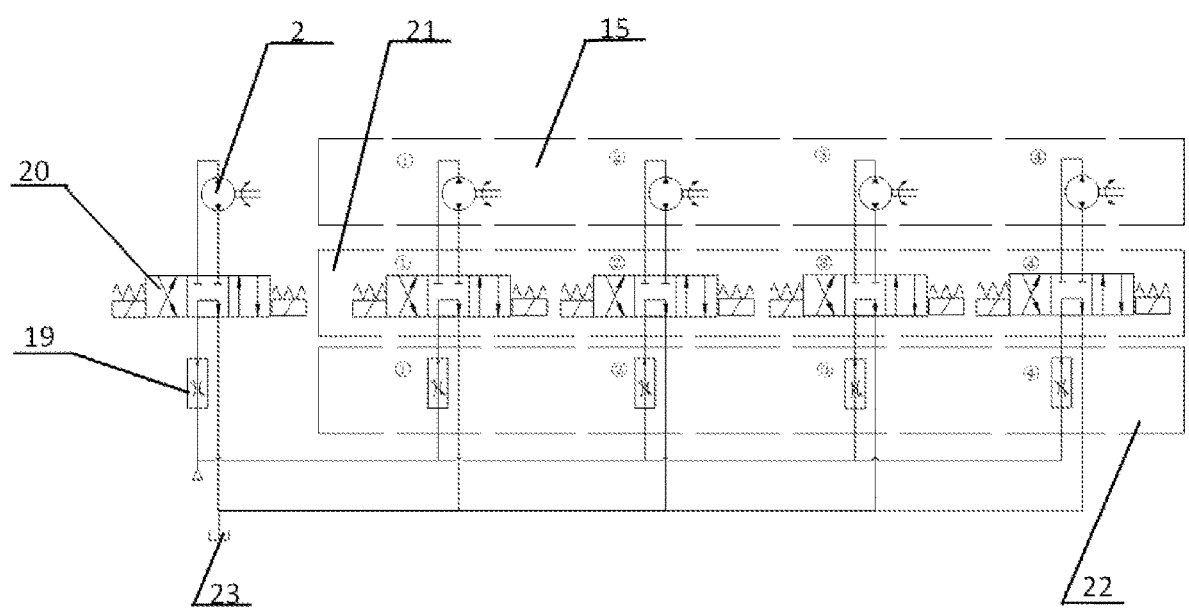
FIG. 3 shows a schematic diagram of the hydraulic system of the three-degree-of-freedom hybrid vibrating screen.

As shown in FIG. 3, the second driving mechanism can be a hydraulic motor or a stepping motor, etc. Preferably, the second driving mechanism comprises four second hydraulic motors 15 in parallel connection to adjust the horizontal attitude angle and inclination angle of the screen surface of the vibrating screen 7. The second hydraulic motor 15 is connected to the oil tank 23 through a pipeline; the connecting pipeline between the second hydraulic motor 15 and the oil tank 23 is provided with a second solenoid directional valve 21 and a second proportional flow valve 22.

As shown in FIGS. 1 and 2, the hoisting method of the three-degree-of-freedom hybrid vibratory screening mechanism in this example is as follows:

The first hydraulic motor 2 is fixedly installed on a side of the base of the frame 1, the eccentric rotating disk 3 is installed on the output shaft of the first hydraulic motor 2, the eccentric rotating disk 3 is connected to one end of the driving link 5 via a first fisheye bearing 4, and the other end of the driving link 5 is fixedly connected to a side of the vibrating screen 7 via a second fisheye bearing 6, to form a serially connected eccentric crank-link mechanism.

The driving link 5 should be kept horizontal with respect to the YZ plane, and the included angle between the driving link 5 and the XY plane should be smaller than 30° to maintain a proper pressure angle.

The sliding table base 12, the lead screw 13, the slide block 14 and the second hydraulic motor 15 form an adjusting component, the lead screw 13 is installed on the center line of the sliding table base 12, the slide block 14 and the lead screw 13 are in threaded transmission coordination with each other, and the slide block 14 moves linearly along the lead screw 13 under the driving of the second hydraulic motor 15.

In this example, four sets of identical adjusting components are provided. The four sets of identical adjusting components are fixedly installed on the columns of the frame 1 respectively. The four sets of adjusting components are arranged in a rectangle, and the center lines of the sliding table bases 12 of the four sets of adjusting components are kept vertical.

The slide blocks 14 of the four sets of adjusting components are respectively connected to one end of four identical hanger rods 17 via a fifth fisheye bearing 16, and the other ends of the four hanger rods 17 are connected to the vibrating screen 7 respectively via a sixth fisheye bearing 18.

The four hanger rods 17 should be kept parallel to each other and hang the vibrating screen 7 on the adjusting components.

One end of the two identical constraining links 9 is connected to a horizontal beam of the frame 1 via a third fisheye bearing 10 and the other end of this two constraining links is connected to one side of the vibrating screen 7 via a fourth fisheye bearing 11.

The two constraining links 9 are kept parallel to each other to form a parallelogram mechanism. The length L of the constraining links 9 should be much greater than the eccentric distance l of the eccentric rotating disk 3 to constrain the degree of freedom of the vibrating screen 7 and ensure the stability of movement of the vibrating screen 7.

The sensors 8 are fixedly installed at the tail part of the vibrating screen 7 (i.e., at the material outlet end), and the length of the monitoring sensors 8 is equal to the width of the vibrating screen 7. Preferably, the sensors 8 are respectively arranged in N monitoring areas of equal width at the tail part of the vibrating screen 7, and the grain loss in the N areas can be monitored respectively during the cleaning operation.

The three-degree-of-freedom movement adjustment method of the three-degree-of-freedom hybrid vibratory screening mechanism in this example is specifically as follows:

The vibrating screen 7 is suspended on the frame 1 by four sets of adjusting components, the fifth fisheye bearing 16, the hanger rods 17 and the sixth fisheye bearing 18, and is constrained by the two constraining links 9, so that the vibrating screen 7 can only reciprocate back and forth.

Under the driving of the first hydraulic motor 2, the power is transferred through a crank-link mechanism consisting of the eccentric rotating disk 3, the first fisheye bearing 4, the driving link 5 and the second fisheye bearing 6 to realize single-degree-of-freedom reciprocating movement of the vibrating screen 7, and the vibration frequency of the vibrating screen 7 can be adjusted by altering the rotating speed of the first hydraulic motor 2.

The sliding table base 12, the screw rod 13, the slide block 14 and the second hydraulic motor 15 form an adjusting component, and four sets of adjusting components are controlled in parallel to realize the adjustment of the inclination angle and horizontal attitude angle of the screen surface of the vibrating screen 7. The specific adjustment method is as follows: decoupling driving equations of the four second hydraulic motors 15 are established according to the structural parameters and installation positions of the four sets of adjusting components, and the position information of the slide blocks are obtained from the lead screw slide rails with position feedback information, and thereby the inclination angle and horizontal altitude angle of the screen surface are determined. The four second hydraulic motors 15 are adjusted in parallel, i.e. the rotation directions and combination mode of the four second hydraulic motors 15 are adjusted, so that the normal angle of the vibrating screen 7 can rotate along the X-axis and the Y-axis in two degrees of freedom. When the normal angle of the vibrating screen 7 rotates along the X-axis, the inclination angle of the screen surface of the vibrating screen 7 is adjusted, and preferably the adjustment range is ±30'; when the normal angle of the vibrating screen 7 rotates along the Y-axis, the horizontal attitude angle of the screen surface of the vibrating screen 7 is adjusted, and the adjustment range is ±15°. As the inclination angle and horizontal attitude angle of the screen surface of the vibrating screen 7 change, the reciprocating trajectory of the vibrating screen 7 changes accordingly, thus the screening performance of the vibrating screen 7 is improved.

The control method of the three-degree-of-freedom hybrid vibratory screening mechanism comprises the following steps:

Detecting, by the sensors 8, the grain loss rates $x_1$, $x_2$, $x_3$ ... $x_n$ in n areas at the tail part of the vibrating screen 7, wherein the total loss rate $x = x_1 + x_2 + x_3 + ... + x_n$;

Transmitting the vibration frequency f, inclination angle $\alpha$ of the screen surface, and horizontal attitude angle $\beta$ of the screen surface of the vibrating screen 7 and the grain loss rate to the controller 24;

Obtaining an ideal horizontal attitude angle $\beta_0$ of the screen surface according to a control model for the horizontal attitude angle $\beta$ of the screen surface, and controlling the second driving mechanism to adjust the horizontal attitude angle of the screen surface of the vibrating screen 7 to $\beta_0$, by the controller 24;

Obtaining an ideal vibration frequency $f_0$ and an ideal inclination angle $\alpha_0$ of the screen surface according to a control model for the vibration frequency f and inclination angle $\alpha$ of the screen surface, controlling the second driving mechanism to adjust the inclination angle of the screen surface of the vibrating screen 7 to $\alpha_0$, and controlling the first driving mechanism to adjust the vibration frequency of the vibrating screen 7 to $f_0$, by the controller 24.

The control model for the horizontal attitude angle $\beta$ of the screen surface is as follows:

$$\begin{cases} V_x = F_3(f, \beta, \chi_1, \chi_2, \chi_3 \cdots \chi_n) \\ \min\{V_x\} \end{cases}$$

Wherein, $V_x$ is a coefficient of variation of material feeding distribution difference for $x_1$, $x_2$, $x_3$ ... $x_n$, respectively.

The control model for the vibration frequency f and the inclination angle $\alpha$ of the screen surface is as follows:

$$\begin{cases} x = F_1(f, \alpha) \\ \gamma = F_2(f, \alpha) \\ \max\{M(x, \gamma) = a_1\gamma - a_2 \times | a_1, a_2 = \text{constant}\} \end{cases}$$

wherein, $\gamma$ is the cleaning rate, $a_1$ and $a_2$ are the weight coefficients respectively.

Figure 4:
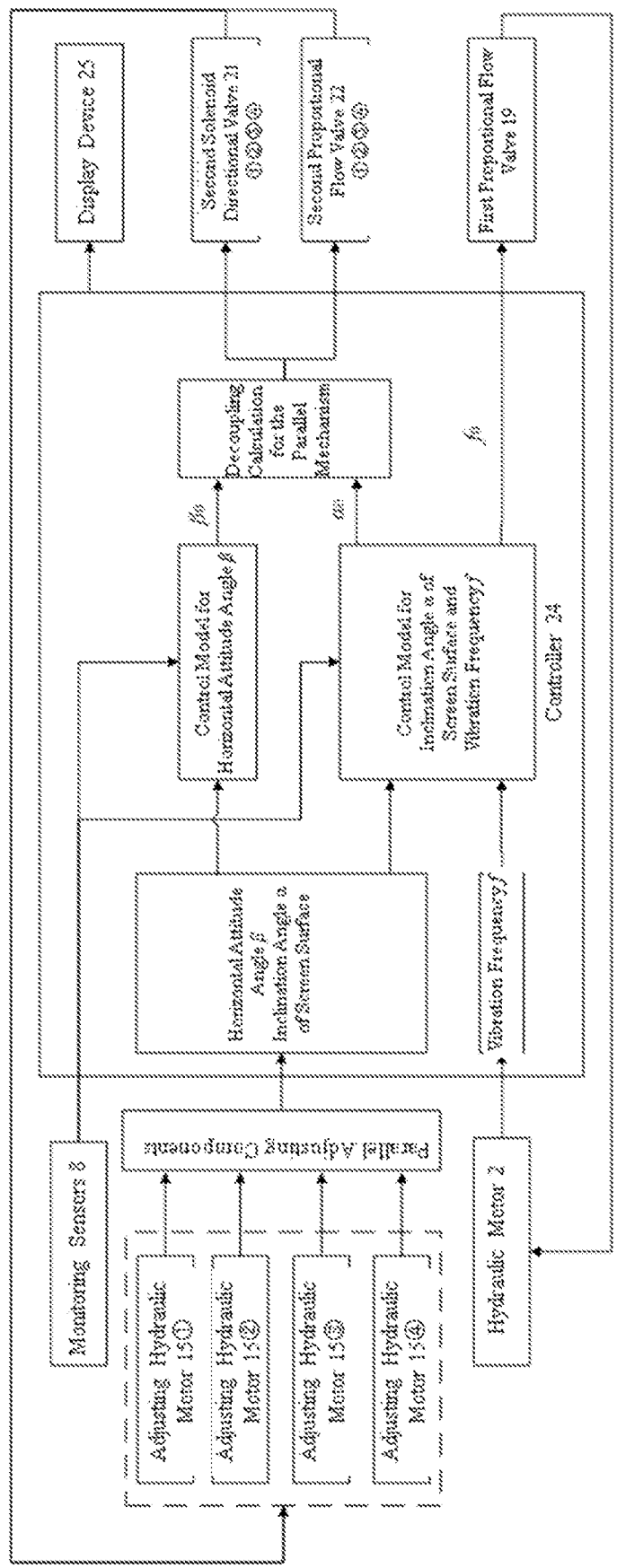
FIG. 4 shows the control schematic diagram of the three-degree-of-freedom hybrid vibrating screen.

As shown in FIG. 4, the control method of the three-degree-of-freedom hybrid vibratory screening mechanism is specifically as follows:

The controller 24 is based on an ARM core, and a control model for the horizontal attitude angle $\beta$ of the screen surface, a control model for the vibration frequency f and a control model for the inclination angle $\alpha$ of the screen surface are established inside the controller.

The controller 24 acquires the position signals of the parallel second driving mechanism in real time, and calculates the horizontal attitude angle $\beta$ and inclination angle $\alpha$ of the screen surface of the vibrating screen 7; the controller 24 acquires the working state of the first hydraulic motor 2 in real time to obtain the reciprocating vibration frequency f of the vibrating screen 7, and the controller 24 acquires the grain loss rates $x_1$, $x_2$, $x_3$ ... $x_n$ from the monitoring sensors 8 in real time.

The controller 24 inputs the real-time monitored horizontal attitude angle $\beta$ of the screen surface and grain loss rates $x_1$, $x_2$, $x_3$ ... $x_n$ into the control model for horizontal attitude angle to optimize and obtain an ideal horizontal attitude angle $\beta_0$ of the screen surface; inputs the real-time monitored inclination angle $\alpha$ of the screen surface and grain loss rates $x_1$, $x_2$, $x_3$ ... $x_n$ into the control model for the inclination angle of the screen surface to optimize and obtain an ideal inclination angle $\alpha_0$ of the screen surface; inputs the real-time monitored vibration frequency f and grain loss rates $x_1$, $x_2$, $x_3$ ... $x_n$ into the control model for vibration frequency to optimize and obtain an ideal vibration frequency $f_0$.

The controller 24 performs decoupling calculation for the parallel mechanism with the $\alpha_0$ and $\beta_0$ obtained through optimization, and controls the working modes of the four second solenoid directional valves 21 and the opening degree of the four second proportional flow valves 22 according to the calculation result, so as to drive and adjust the four second hydraulic motors 15 to work in parallel and adjust the inclination angle and horizontal attitude angle of the screen surface of the vibrating screen 7.

The controller 24 controls the opening degree of the first proportional flow valve 19 according to the $f_0$ obtained through optimization and changes the rotation speed of the first hydraulic motor 2, so as to adjust the vibration frequency of the vibrating screen 7.

The state parameters, including the horizontal attitude angle $\beta$, inclination angle $\alpha$ of the screen surface, vibration frequency f and grain loss rates $x_1, x_2, x_3 \ldots x_n$, are displayed in real time on the display device 25.

The method for establishing the control model for the three-degree-of-freedom hybrid vibratory screening mechanism is specifically as follows:

The control of the screening mechanism is an optimized control process aiming at decreasing the total cleaning loss rate x and improving the cleaning rate $\gamma$, with the vibration frequency f of the vibrating screen 7, the inclination angle $\alpha$ of the screen surface, and the horizontal attitude angle $\beta$ of the screen surface as objects.

Firstly, when the horizontal attitude angle $\beta$ of the screen surface is 0, the mixed material after grain threshing is fed in uniform distribution from the front part of the vibrating screen 7, and the material is transported to the tail part of the vibrating screen 7 under the action of vibration. In this process, the grains fall through the meshes of the vibrating screen 7, and the impurities are discharged from the tail part of the vibrating screen 7. Through theoretical calculation and experimental analysis, equations representing the effects of the vibration frequency f and the inclination angle $\alpha$ of the screen surface of the vibrating screen 7 on the total cleaning loss rate x and the cleaning rate $\gamma$ under the conditions of mixed materials with different characteristics and different feeding rates are established respectively through regression fitting:

$$\chi = F_1(f, \alpha)$$

$$\gamma = F_2(f, \alpha)$$

Secondly, the mixed material after grain threshing is fed in non-uniform distribution from the front part of the vibrating screen 7. At this time, since the material is not distributed uniformly on the screen surface of the vibrating screen 7, the distribution of grain loss at the tail part of the vibrating screen 7 is also not uniform; the grain loss rates $x_1, x_2, x_3 \ldots x_n$ in N areas are obtained by means of the monitoring sensor 8, and the total loss rate $x = x_1 + x_2 + x_3 + \ldots + x_n$. Through theoretical calculation and experimental analysis, the effect of feeding distribution difference of the mixed material on the coefficients of variation $V_x$ for $x_1, x_2, x_3 \ldots x_n$ is analyzed, and a model of horizontal attitude angle $\beta$ of the of screen surface, vibration frequency f and $V_x$ is established through regression fitting.

$$V_\chi = F_3(f, \beta, \chi_1, \chi_2, \chi_3 \ldots \chi_n)$$

The optimization method is as follows:

The smaller the coefficient of variation $V_x$ is, the more uniform the material distribution on the screen surface of the vibrating screen 7 is, which is beneficial for improving the screening efficiency. Therefore, based on the equation $V_x = F_3 (f, \beta, x_1, x_2, x_3 \ldots x_n)$, an ideal horizontal attitude angle $\beta_0$ of the screen surface is obtained through optimization with an objective of decreasing $V_x$, i.e. a control model for the horizontal attitude angle $\beta$ of the screen surface is established:

$$\begin{cases} V_x = F_3(f, \beta, \chi_1, \chi_2, \chi_3 \cdots \chi_n) \\ \min\{V_x\} \end{cases}$$

An objective equation $M(\chi, \gamma) = a_1\gamma - a_2\chi$ is established with objectives of decreasing the total cleaning loss rate x and improving the cleaning rate $\gamma$, wherein $a_1$ and $a_2$ are weight coefficients set on the basis of artificial experience according to the operating performance requirements; with equations $\chi = F_1(f, \alpha)$ and $\gamma = F_2(f, \alpha)$ as constraint conditions, an ideal vibration frequency $f_0$ and an ideal inclination angle $\alpha_0$ of the screen surface of the vibrating screen 7 are obtained through optimization, i.e., a control model for the vibration frequency f and the inclination angle $\alpha$ of the screen surface is established:

$$\begin{cases} x = F_1(f, \alpha) \\ \gamma = F_2(f, \alpha) \\ \max\{M(x, \gamma) = a_1\gamma - a_2 \times | a_1, a_2 = \text{constant}\} \end{cases}$$

The controller 24 controls the horizontal attitude angle of the screen surface, the inclination angle of the screen surface, and the vibration frequency of the vibrating screen 7 through the following steps in detail:

The controller 24 controls the operating mode of the second solenoid directional valve 21 and the opening degree of the second proportional flow valve 22 arranged on the connecting pipeline between the second driving mechanism and the oil tank 23 respectively, to drive the operation of the second driving mechanism and adjust the horizontal attitude angle and inclination angle of the screen surface of the vibrating screen 7; the controller 24 controls the opening degree of the first proportional flow valve 19 arranged on the connecting pipeline between the first driving mechanism and the oil tank 23, to drive the operation of the first driving mechanism and adjust the vibration frequency of the vibrating screen 7.

The principle of the hydraulic system in the present invention is as follows:

As shown in FIG. 3, the hydraulic system mainly comprises a first proportional flow valve 19, a first solenoid directional valve 20, a second solenoid directional valve 21, a second proportional flow valve 22, a first hydraulic motor 2, a second hydraulic motor 15, and an oil tank 23. The high-pressure oil passes through the first proportional flow valve 19, the first solenoid directional valve 20 and the first hydraulic motor 2 sequentially, and then returns to the oil tank 23. The electric signals outputted from the controller 24 control the reversing of the solenoid valves and the opening degree of the proportional flow valves.

The high-pressure oil drives the first hydraulic motor 2 via the first proportional flow valve 19 and the first solenoid directional valve 20. When both the left and right coils of the first solenoid directional valve 20 are not energized, the first solenoid directional valve 20 is in a neutral position, the high-pressure oil directly returns to the oil tank 23, and the first hydraulic motor 2 is not in operation. When the left or right coil of the first solenoid directional valve 20 is energized, the first hydraulic motor 2 rotates to operate and drive the vibrating screen 7 to reciprocate in a single degree of freedom. The rotation direction of the first hydraulic motor 2 can be changed by controlling the power supply to the left coil or right coil of the first solenoid directional valve 20. The rotational speed of the first hydraulic motor 2, i.e., the reciprocating frequency of the vibrating screen 7, can be controlled by adjusting the opening degree of the first proportional flow valve 19.

Specifically, in this example, the second solenoid directional valve 21 is composed of four identical three-position four-way solenoid directional valves, and the second proportional flow valve 22 is composed of four identical proportional flow valves. The high-pressure oil drives four second hydraulic motors 15 via the second proportional flow valves 22 and the second solenoid directional valves 21 respectively. The working principle of the second hydraulic motor 15 is the same as that of the first hydraulic motor 2. By changing the rotation directions and combination mode of the four second hydraulic motors 15, the normal angle of the vibrating screen 7 can rotate along the X-axis and the Y-axis in two degrees of freedom.

When the vibrating screen 7 of the present invention operates, the vibrating screen 7 is driven by the first hydraulic motor 2 and the serially connected eccentric crank-link mechanism to reciprocate in a single degree of freedom, and the vibration frequency f is controlled by the rotation speed of the first hydraulic motor 2. The controller 24 acquires the horizontal attitude angle $\beta$, the inclination angle $\alpha$ of the screen surface, and the reciprocating vibration frequency f of the vibrating screen 7 and the grain loss rates $x_1, x_2, x_3 \ldots x_n$ outputted from the sensors 8 in real time, inputs them into the control model for the horizontal attitude angle $\beta$ of the screen surface and the control model for the vibration frequency f and the inclination angle $\alpha$ of the screen surface inside the controller 24, and obtains an ideal horizontal attitude angle $\beta_0$ of the screen surface, and ideal inclination angle $\alpha_0$ of the screen surface, and an ideal vibration frequency $f_0$ through optimization and calculation.

The controller 24 adjusts the opening degree of the first proportional flow valve 19 according to $f_0$ and changes the rotation speed of the first hydraulic motor 2, so as to adjust the vibration frequency of the vibrating screen 7. The controller 24 performs decoupling calculation for the parallel mechanism according to $\alpha_0$ and $\beta_0$, and controls the working modes of the four second solenoid directional valves 21 and the opening degrees of the four second proportional flow valves 22 according to the calculation result, so as to drive the four second hydraulic motors 15 to work in parallel and adjust the inclination angle and horizontal attitude angle of the screen surface of the vibrating screen 7. As a result, the vibrating screen 7 operates under the ideal horizontal attitude angle $\beta_0$ of the screen surface, the ideal inclination angle $\alpha_0$ of the screen surface and the ideal vibration frequency $f_0$, and the working state parameters are displayed in real time on the display device 25. Thus, the screening performance is improved.

The present invention incorporates mechanism design, sensor technology and movement optimization control, promotes uniform distribution of the material on the screen surface by monitoring the cleaning loss condition of the grains in real time, feeding back and adjusting the operation parameters of the vibrating screen, and has important theoretical research significance and practical value for improving the screening efficiency of grains and improving the operation performance of the entire machine.

The present invention relates to a novel three-degree-of-freedom hybrid vibratory screening mechanism (two rotational degrees of freedom and one translational degree of freedom), which is especially applicable to cleaning devices of combined grain harvesters, and can realize separation of grains from impurities in the combined grain harvesting process of rice, wheat and the like. In this example, the vibrating screen is suspended mainly by four sets of adjusting components and hanger rods, the adjusting components are vertically and fixedly installed on the frame 1, and four sets of hydraulic motors are used for parallel driving to realize two-degree-of-freedom rotational adjustment of the horizontal attitude angle and inclination angle of the screen surface of the vibrating screen, and the vibrating screen 7 is driven by the crank-link mechanism to reciprocate in a single degree of freedom, and thereby three-degree-of-freedom vibration adjustment of the screen surface is realized; a vibration parameter control model is established by means of theoretical analysis in combination with experiment. In the operation process, the sensors 8 installed at the tail part of the vibrating screen monitor the grain loss rate and distribution in real time, and the horizontal attitude angle and inclination angle of the screen surface and the vibration frequency are optimized and adjusted self-adaptively to promote uniform and discrete distribution of the material on the screen surface. Thus, the screening efficiency of the material under a non-uniform feeding condition can be effectively improved, and the grain loss rate can be decreased.

Example 2

A harvester, comprising the three-degree-of-freedom hybrid vibratory screening mechanism described in example 1, thus having the beneficial effects mentioned in example 1. The harvester will not be described in detail here again.

It should be understood: though the present invention is described according to the examples in this document, each of the examples shall not be deemed as including only one independent technical scheme, the description in such a way in this document is only for the purpose of clarity. Those skilled in the art should comprehend the description in entirety, and the technical schemes in the examples may be combined appropriately to form other embodiments that can be understood by those skilled in the art.

The above detailed description is provided only to describe some feasible examples of the present invention, rather than limit the protection scope of the present invention. Any equivalent example or modification implemented without departing from the spirit of the present invention shall be deemed as falling in the protection scope of the present invention.

The invention claimed is:
1. A three-degree-of-freedom hybrid vibratory screening mechanism, characterized in that, it comprises:
   a vibrating screen;
   a first driving mechanism, which is connected to the vibrating screen and drives the vibrating screen to reciprocate;
   a second driving mechanism, which is connected to the vibrating screen and configured to adjust the inclination angle $\alpha$ and horizontal attitude angle $\beta$ of the screen surface of the vibrating screen;
   sliding table bases, lead screws and slide blocks, wherein each lead screw is installed on a corresponding sliding table base, each slide block is installed on a corresponding lead screw, and an output shaft of the second driving mechanism is connected to the lead screws; each slide block is rotationally connected to one end of a hanger rod, and the other end of the hanger rod is rotationally connected to the vibrating screen;
   sensors configured to monitor the grain loss rate at a tail part of the vibrating screen; and
   a controller connected to the first driving mechanism, the second driving mechanism and the sensors respectively.

2. The three-degree-of-freedom hybrid vibratory screening mechanism according to claim 1, wherein the second driving mechanism comprises a plurality of second hydraulic motors connected in parallel;

a first solenoid directional valve and a second proportional flow valve are arranged between the second hydraulic motors and an oil tank.

3. The three-degree-of-freedom hybrid vibratory screening mechanism according to claim 1, wherein the first driving mechanism is a first hydraulic motor;

a connecting pipeline between the first hydraulic motor and the oil tank is provided with a first proportional flow valve and a first solenoid directional valve.

4. The three-degree-of-freedom hybrid vibratory screening mechanism according to claim 1, wherein the first driving mechanism is connected to the vibrating screen via an eccentric crank-link mechanism;

the eccentric crank-link mechanism comprises an eccentric rotating disk and a driving link;

the eccentric rotating disk is installed on an output shaft of the first driving mechanism, and is rotationally connected to one end of the driving link, and the other end of the driving link is rotationally connected to the vibrating screen.

5. The three-degree-of-freedom hybrid vibratory screening mechanism according to claim 1, wherein, it further comprises a constraining link;

one end of the constraining link is configured to connect to a frame, and the other end of the constraining link is connected to the vibrating screen.

6. A harvester, comprising the three-degree-of-freedom hybrid vibratory screening mechanism according to claim 1.

7. A control method of the three-degree-of-freedom hybrid vibratory screening mechanism according to claim 1, characterized in that, it comprises the following steps:

monitoring, by the sensors, the grain loss rates x1, x2, x3 . . . xn inn areas at the tail part of the vibrating screen, the total loss rate x=x1+x2+x3+ . . . +xn;

transmitting the vibration frequency f, inclination angle $\alpha$ of the screen surface, and horizontal attitude angle $\beta$ of the screen surface of the vibrating screen and the grain loss rate to the controller;

obtaining an ideal horizontal attitude angle $\beta 0$ of the screen surface according to a control model for the horizontal attitude angle $\beta$ of the screen surface, and controlling the second driving mechanism to adjust the horizontal attitude angle of the screen surface of the vibrating screen to $\beta 0$, by the controller;

obtaining an ideal vibration frequency f0 and an ideal inclination angle $\alpha 0$ of the screen surface according to a control model for the vibration frequency f and inclination angle $\alpha$ of the screen surface, controlling the second driving mechanism to adjust the inclination angle of the screen surface of the vibrating screen to $\alpha 0$, and controlling the first driving mechanism to adjust the vibration frequency of the vibrating screen to f0, by the controller.

8. The control method of the three-degree-of-freedom hybrid vibratory screening mechanism according to claim 7, wherein the control model for the horizontal attitude angle $\beta$ of the screen surface is:

$$\begin{cases} V_x = F_3(f, \beta, \chi_1, \chi_2, \chi_3 \cdots \chi_n) \\ \min\{V_x\} \end{cases}$$

where, Vx is a coefficient of variation of material feeding distribution difference for x1, x2, x3 . . . xn, respectively.

9. The control method of the three-degree-of-freedom hybrid vibratory screening mechanism according to claim 7, wherein the control model for the vibration frequency f and the inclination angle $\alpha$ of the screen surface is:

$$\begin{cases} x = F_1(f, \alpha) \\ \gamma = F_2(f, \alpha) \\ \max\{M(\chi, \gamma) = a_1 \gamma - a_2 \chi \mid a_1, a_2 = \text{constant}\} \end{cases}$$

where, $\gamma$ is cleaning rate and a1 and a2 are the weight coefficients respectively.

10. The control method of the three-degree-of-freedom hybrid vibratory screening mechanism according to claim 7, wherein the step of controlling the horizontal attitude angle of the screen surface, inclination angle of the screen surface and vibration frequency of the vibrating screen by the controller is specifically as follows:

controlling the operating mode of the second solenoid directional valve and the opening degree of the second proportional flow valve arranged between the second driving mechanism and the oil tank respectively to drive the operation of the second driving mechanism and adjust the horizontal attitude angle and inclination angle of the screen surface of the vibrating screen, by the controller; and controlling the opening degree of the first proportional flow valve arranged between the first driving mechanism and the oil tank to drive the operation of the first driving mechanism and adjust the vibration frequency of the vibrating screen, by the controller.

\* \* \* \* \*